United States Patent
Mita et al.

(10) Patent No.: US 6,207,927 B1
(45) Date of Patent: Mar. 27, 2001

(54) GAS-SHIELDED AC ARC WELDING METHOD AND MACHINE MAKING USE OF CONSUMABLE ELECTRODE

(75) Inventors: Tsuneo Mita; Tsuneo Shinada; Kazushige Ichikawa, all of Kanagawa; Yoshitaka Sakamoto; Koji Nomura, both of Aichi; Seigo Nishikawa, Fukuoka, all of (JP)

(73) Assignees: Hitachi Seiko, Ltd., Ebina; Kabushiki Kaisha Yaskawa Denki, Kitakyushu, both of (JP)

( * ) Notice: Subject to any disclaimer, the term of this patent is extended or adjusted under 35 U.S.C. 154(b) by 0 days.

(21) Appl. No.: 09/247,606

(22) Filed: Feb. 10, 1999

(30) Foreign Application Priority Data

Feb. 12, 1998 (JP) .................................................. 10-030023

(51) Int. Cl.[7] ...................................................... B23K 9/09
(52) U.S. Cl. ................................ 219/130.51; 219/137 PS
(58) Field of Search ......................... 219/130.51, 130.21, 219/130.31, 130.32, 130.33, 137 PS

(56) References Cited

U.S. PATENT DOCUMENTS 5,220,151 * 6/1993 Terayama et al. .............. 219/130.51
5,225,660 * 7/1993 Mita et al. ...................... 219/130.51

* cited by examiner

Primary Examiner—Clifford C. Shaw
(74) Attorney, Agent, or Firm—Evenson, McKeown, Edwards & Lenahan, P.L.L.C.

(57) ABSTRACT

An EP output voltage to be outputted during a period of EP polarity is set so that a welding current becomes equal to or lower than a critical current level, and an EN output voltage to be outputted during a period of EN polarity is set at a level lower than the EP output voltage. This makes it possible to substantially equalize a wire melting rate in the period of EN polarity and that in the period of EP polarity with each other. Even at such a short arc length as causing frequent short circuiting, gas-shielded AC arc welding making use of a consumable wire can be still performed stably so that high wire melting rate, shallow penetration, convex weld reinforcement and the like, which are characteristic features of AC welding, can each be set selectively at a desired level or in a desired shape depending on the application.

9 Claims, 8 Drawing Sheets

FIG.5

| No. | Wire diameter (mm) | Shielding gas comp'n | Wire feeding rate (m/min) | Voltage upon EP polarity welding $V_{EP}$ (V) | Voltage upon EN polarity welding $V_{EN}$ (V) | AC frequency $f_{AC}$ (Hz) | Percentage of EP polarity period $\delta$ (%) | Results of welding |
|---|---|---|---|---|---|---|---|---|
| 1 | ⌀0.6 | Ar+20%CO₂ | 5.3 | 16.5 | 15.5 | 3.3 | 50 | Good |
| 2 | | | 7.6 | 16.5 | 16.0 | | | Good |
| 3 | | | 7.6 | 17.5 | 16.0 | | | Good |
| 4 | | | | 17.0 | 16.5 | | | Good |
| 5 | | | 10.7 | 17.0 | 15.5 | | | Good |
| 6 | | | | 18.0 | 16.5 | | | Good |
| 7 | ⌀0.6 | Ar+20%CO₂ | 7.6 | 17.0 | 16.0 | 3.3 | 50 | Good |
| 8 | | | | | | 5 | | Good |
| 9 | | | | | | 10 | | Good |
| 10 | | | | | | 25 | | Good |
| 11 | | | | | | 50 | | Good |
| 12 | | | | | | 100 | | Good |
| 13 | ⌀0.6 | Ar+20%CO₂ | 7.6 | 17.0 | 16.0 | 3.3 | 98 | Good |
| 14 | | | | | | | 83 | Good |
| 15 | | | | | | | 67 | Good |
| 16 | | | | | | | 33 | Good |
| 17 | | | | | | | 17 | Good |
| 18 | | | | | | | 2 | Good |
| 19 | ⌀0.8 | Ar+20%CO₂ CO₂ | 3.0 | 16.0 | 15.0 | 3.3 | 50 | Good |
| 20 | | | 3.0 | 18.0 | 17.5 | | | Good |
| 21 | | | 4.5 | 18.5 | 17.5 | | | Good |
| 22 | ⌀0.9 | Ar+20%CO₂ | 2.3 | 15.5 | 15.0 | 3.3 | 50 | Good |
| 23 | | | 3.4 | 17.0 | 16.0 | | | Good |
| 24 | | | 4.7 | 18.0 | 16.5 | | | Good |
| 25 | | | 6.2 | 19.5 | 17.0 | | | Good |

FIG.8
```
Test piece : 60/60 zinc plated steel
             thickness : 0.7 mm
Wire :   JIS YGW12 (0.6 mm in diameter)
                  Wire feeding rate : 7.6m/min
         Root gap :          2 mm
         Welding speed :    180 mm/min
```
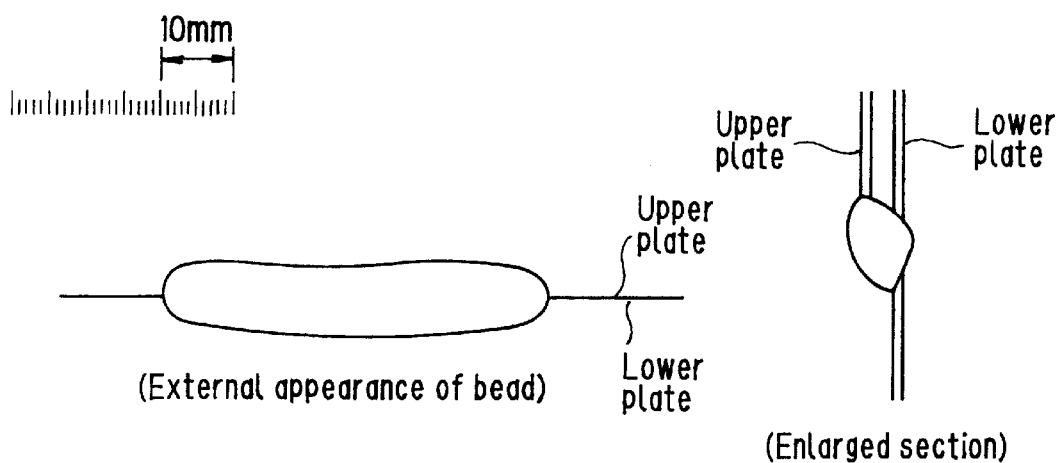
(External appearance of bead)      (Enlarged section)
(a)  3.3Hz AC
     ( δ = 50%)
     48 A, 17.5 V
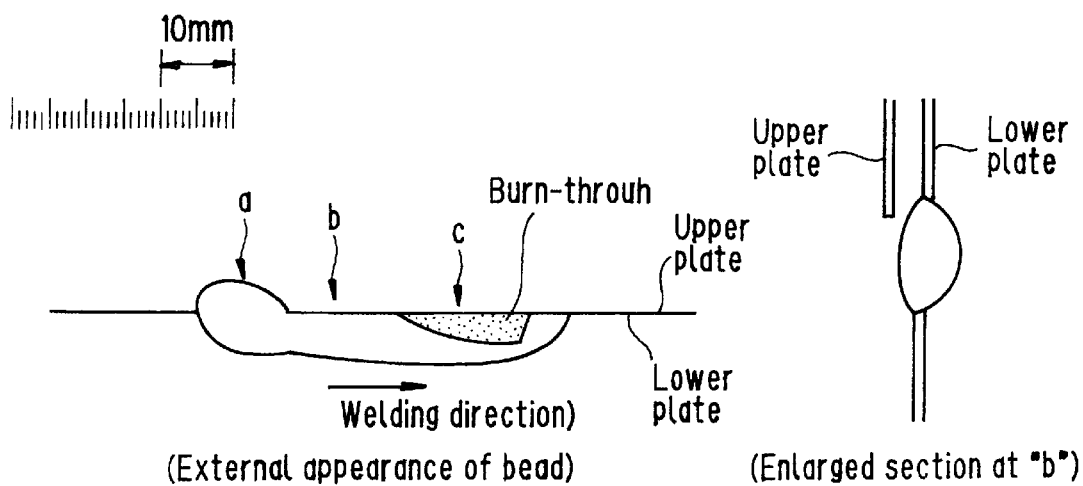
(External appearance of bead)      (Enlarged section at "b")
(b)  DC-EP polarity
     53 A, 18 V

GAS-SHIELDED AC ARC WELDING METHOD AND MACHINE MAKING USE OF CONSUMABLE ELECTRODE

BACKGROUND OF THE INVENTION a) Field of the Invention

This invention relates to a gas-shielded AC arc welding method and machine, which perform welding by supplying a substantially constant AC voltage between the consumable electrode, which is being fed at a substantially constant rate, and a workpiece.

b) Description of the Related Art

Direct current (DC) arc welding is seldom performed by straight polarity alone (hereinafter called "EN polarity"), because EN polarity tends to form a large droplet at a wire tip, an arc is unstable, large spatters are splashed, and penetration is shallow. On the other hand, reverse polarity (hereinafter called "EP polarity") features a small droplet, a stable arc and deep penetration. EP polarity has found widespread utility, since good welding results are available not only in large current welding in which an arc length is great but also in so-called short-circuiting transfer welding in which welding is performed by reducing an arc length and frequently repeating short circuiting and arcing with a small current. Further, as a gas-shielded consumable-electrode arc welding method and machine making use of an AC output, there is a technique disclosed in Japanese Patent No. 2,666,315. According to this technique, the level of a current in a period of EP polarity and the length of the period of EP polarity, which provide pinch force suitable for the smooth transfer of a droplet, are set in accordance with the material and diameter of a wire as a consumable electrode, the composition of shielding gas and the like, and the frequency of an output voltage and the level of a current in a period of EN polarity are set in relation to a wire feeding rate. This makes it possible to broaden the range of optimal welding conditions, so that rearcing is assured at alternation without superimposition of high frequency, high voltage, pulses or the like, thereby permitting stable gas-shielded AC arc welding with a consumable electrode.

As a welding machine permitting stable gas-shielded AC arc welding with a consumable electrode, the welding machine disclosed in the above-mentioned Japanese Patent No. 2,666,315 is provided with a wire feeding rate setting device for outputting a wire feeding rate setting signal in correspondence to the level of an output current, an output voltage frequency signal generator for being inputted with the wire feeding rate setting signal and then outputting an output voltage frequency signal which corresponds to a frequency of an output voltage, an EP polarity period signal generator for outputting an EP polarity period energization signal in correspondence to a setting signal set beforehand in accordance with conditions such as the material and diameter of a wire and the composition of shielding gas, an EP polarity current signal generator for outputting an EP polarity current signal in correspondence to the setting signal, an EN polarity period signal generator for outputting an EN polarity period energization signal on the basis of the EP polarity period energization signal as an input, an EN polarity current signal generator for outputting an EN polarity current signal on the basis of the wire feeding rate setting signal as an input, said wire feeding rate setting signal corresponding to the output current, an output current controller for controlling the level of an EN polarity current and that of an EP polarity current on the basis of the EN polarity current signal and the EP polarity current signal as inputs, respectively, and an output current energization period controller for controlling an EN polarity current energization period and EP polarity current energization period on the basis of the EN polarity period energization signal and EP polarity energization period as inputs, respectively, whereby a welding output is controlled.

The above-described conventional technique which makes use of an AC output is a welding method in which a droplet formed at a wire tip is transferred in a contactless manner to a base material by making use of magnetic pinch force produced by an EP polarity current of a critical current level or higher. Accordingly, the stability of an arc is impaired if the length of the arc is shortened and short circuiting is developed. Further, when the welding current level becomes higher, that is, the wire feeding rate becomes faster, the period of an EN polarity current becomes shorter, thereby making it impossible to utilize characteristic features of welding in an EN polarity period, such as shallow penetration and high wire melting rate.

SUMMARY OF THE INVENTION

An object of the present invention is therefore to solve or reduce the above-described problems of the conventional art, and specifically to provide a gas-shielded AC arc welding method and machine making use of a consumable electrode, which make it possible to obtain a stable arcing state even in short-arc welding accompanied by frequent occurrence of short circuiting and also to set the AC frequency and the percentages of EP and EP polarity periods as desired relative to any welding current level, thereby assuring full utilization of the advantages of AC arc welding, i.e., characteristic features such as shallow penetration and high wire melting rate.

In one aspect of the present invention, there is provided a gas-shielded AC arc welding method making use of a consumable electrode for performing welding by supplying a substantially constant AC voltage between the consumable electrode, which is being fed at a substantially constant rate, and a workpiece, which comprises:

setting an EP output voltage $V_{EP}$ to be outputted during a period $T_{EP}$ of EP polarity so that a welding current during the period of EP polarity becomes not higher than a critical current level; and also setting an EN output voltage $V_{EN}$, which is to be outputted during a period $T_{EN}$ of EN polarity, at a level lower than the EP output voltage $V_{EP}$.

In the above method, a difference between the EP output voltage $V_{EP}$ and the EN output voltage $V_{EN}$ may be increased as a welding current increases. It is also possible to vary percentages of the period $T_{EP}$ of EP polarity and the period $T_{EN}$ of EN polarity based on a total time of the periods $T_{EP}, T_{EN}$.

In another aspect of the present invention, there is also provided a gas-shielded AC arc welding machine making use of a consumable electrode and adapted to supply a substantially constant alternating voltage between the consumable electrode and a workpiece via an output circuit, whereby a droplet formed at a tip of the consumable electrode is short-circuiting transferred, comprising:

a wire feed controller for feeding the consumable electrode at substantially a constant rate, a setting device for a period $T_{EP}$ of EP polarity, a setting device for a period $T_{EN}$ of EN polarity, a setting device (13) for an EP output voltage $V_{EP}$ to be outputted during the period $T_{EP}$ of EP polarity, a setting device (14) for an EN output voltage $V_{EN}$ to be outputted during the period $T_{EN}$ of EN polarity, an output voltage controller for controlling levels of the EP and EN output voltages $V_{EP}, V_{EN}$ based on signals outputted from the setting devices for the EP and EN output voltages $V_{EP}, V_{EN}$, respectively, and a polarity period controller for controlling lengths of the periods $T_{EP}, T_{EN}$ of EP and EN polarities based on signals outputted from the setting devices for the periods $T_{EP}, T_{EN}$ of EP and EN polarities, respectively, whereby a welding output is controlled; and a circuit formed of a minimum current compensator, which serves to compensate a lower limit of a welding current, and a reactor connected in series with the minimum current compensator, and connected in parallel with the output circuit.

The above machine may further comprise:

a setting device for an average welding voltage $V_{av}$, and a setting device for a difference a between the EP output voltage $V_{EP}$ and the EN output voltage $V_{EN}$, whereby the levels of the output EP and EN voltages $V_{EP}, V_{EN}$ may be set in accordance with the following formulas:

$$V_{EP} = V_{av},$$

and $$V_{EN} = V_{av} - \alpha.$$

In addition, the above machine may further comprises:

an AC frequency $f_{AC}$ setting device for setting an AC frequency $f_{AC}$, and a time percentage δ setting device for setting a time percentage δ of the period $T_{EP}$ of EP polarity, whereby lengths of the periods $T_{EP}, T_{EN}$ of EP and EN polarities may be set in accordance with the following formulas:

$$T_{EP} = \delta/100 \cdot f_{AC},$$

and $$T_{EN} = (100-\delta)/100 \cdot f_{AC}.$$

Furthermore, the above machine may further comprises a setting device for increasing or decreasing the difference a between the EP output voltage $V_{EP}$ and the EN output voltage $V_{EN}$ on a basis of a wire feeding rate signal outputted from the wire feed controller.

By setting the EP output voltage VEP to be outputted during the period $T_{EP}$ of EP polarity and the EN output voltage $V_{EN}$ to be outputted during the period $T_{EN}$ of EN polarity as described above in accordance with the present invention, a wire melting rate in the period ($T_{EN}$) of EN polarity and that in the period ($T_{EP}$) of EP polarity can be substantially equalize with each other so that even at such a short arc length as causing frequent short circuiting, gas-shielded AC arc welding making use of a consumable wire can be still performed stably. Moreover, no limitation is imposed on AC frequency and the percentages of the periods of EN and EP polarities. This makes it possible to selectively set each of high wire melting rate, shallow penetration, convex weld reinforcement and the like, which are characteristic features of AC welding, at a desired level or in a desired shape depending on the application. As a consequence, good weld beads can be formed without burn-through or dripping, for example, even in one side welding for a fillet joint between extremely thin plates of 1 mm or less in thickness at a root gap three times as great as the plate thickness, leading to a significant enlargement in the weldable range.

BRIEF DESCRIPTION OF THE DRAWINGS

FIG. 5 is a table showing welding results in certain representative working examples of the present invention;

FIG. 8 illustrates results of illustrative one side welding for fillet joint as applied to extremely thin plates.

DETAILED DESCRIPTION OF THE INVENTION AND PREFERRED EMBODIMENTS

A description will first be made of the principle of welding according to the present invention.

When short-circuiting transfer welding is performed by EP polarity alone while maintaining the wire feeding rate WF at constant, welding characteristics can be roughly divided, depending on the level of a preset output voltage $V_{EP}$, into an undervoltage zone where a wire feeding rate WF is higher than a wire melting rate $MR_{EP}$, a stable arc zone where a wire feeding rate WF and a wire melting rate $MR_{EP}$ are substantially equal to each other, or an overvoltage zone where a wire melting rate $MR_{EP}$ is higher than a wire feeding rate WF. Likewise, when short-circuiting transfer welding is performed by EN polarity alone, welding characteristics can be roughly divided, depending on the level of a preset output voltage $V_{EN}$, into an undervoltage zone where a wire feeding rate WF is higher than a wire melting rate $MR_{EN}$, a stable arc zone where a wire feeding rate WF and a wire melting rate $MR_{EN}$ are substantially equal to each other, or an overvoltage zone where a wire melting rate $MR_{EN}$ is higher than a wire feeding rate WF. However, a proper voltage range for welding by EN polarity alone is substantially the same as a proper voltage range for welding by EP alone or is somewhat shifted toward a lower voltage side (a side closer to 0 V; the level of each voltage will hereinafter be indicated by an absolute value). Even when welding is performed by EN polarity, shortening of the length of an arc by lowering an output voltage into such an arc voltage range as permitting short-circuiting transfer welding makes it possible to significantly suppress occurrence of large spatters without any substantial reduction in the stability of the arc, thereby permitting welding with shallow penetration.

Figure 1:
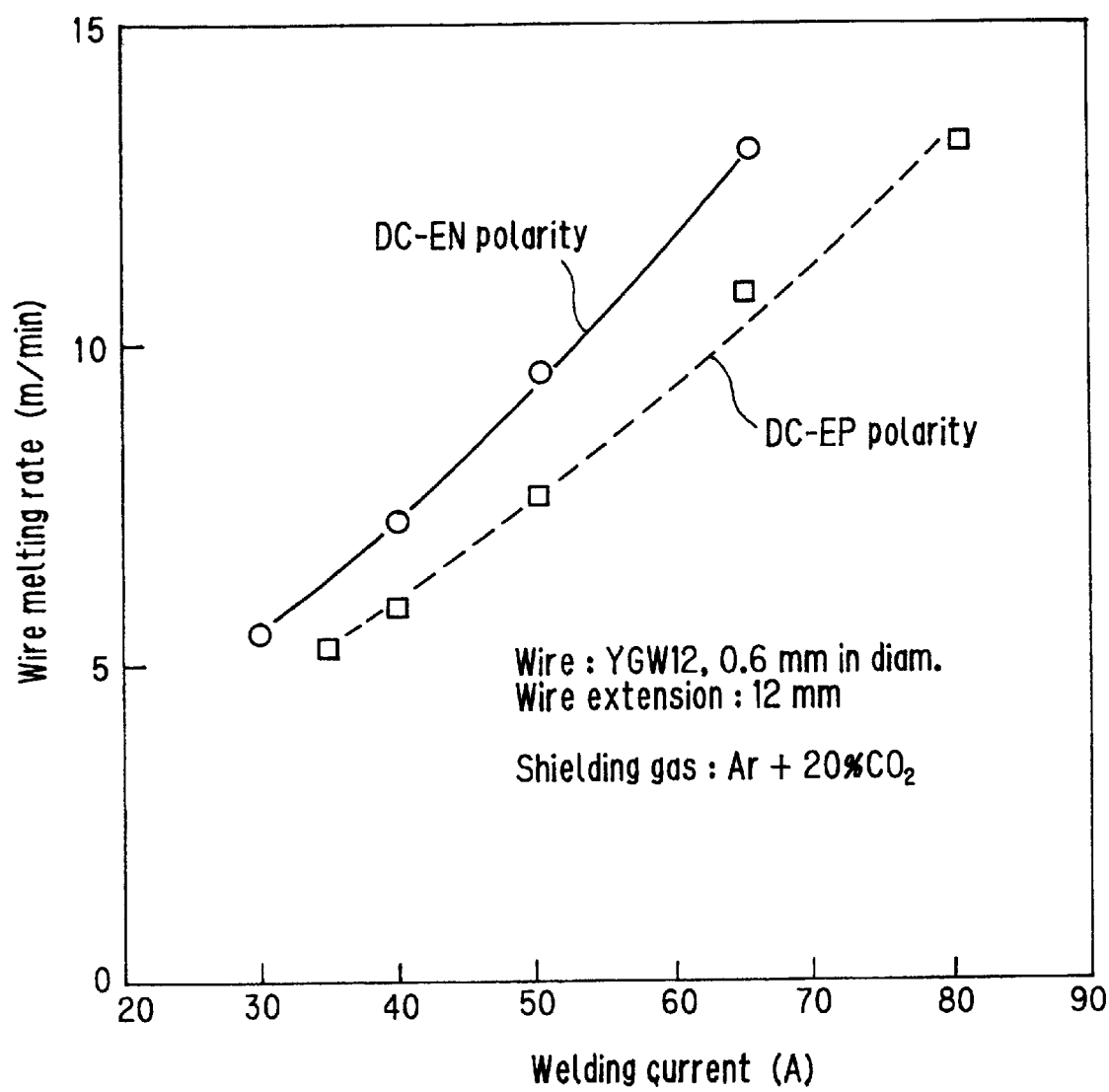
FIG. 1 is a graphical representation of wire melting rate against welding current when EN polarity welding and EP polarity welding were each performed at the same preset voltage in a stable arc zone.

Referring now to FIG. 1, a description will hereinafter be made about a relationship between wire melting rate and welding current upon performance of each of EN polarity welding and EP polarity welding at the same preset voltage in a stable arc zone. The welding tests were performed using JIS YGW12 of 0.6 mm in diameter as a wire and Ar+20% $CO_2$ premixed gas as a shielding gas while setting the wire extension at 12 mm. From the graphic representation of FIG. 1, it is appreciated that at the same welding current level, EN polarity is larger in wire melting rate than EP polarity. When AC arc welding is performed by setting the output voltage at the same level in both EN polarity and EP polarity, the wire is excessively melted upon EN polarity welding and the length of an arc varies in synchronization with the AC cycle, thereby making it impossible to perform stable AC arc welding. It is also appreciated that the difference in wire melting rate between EN polarity and EP polarity tends to become greater with the welding current.

Figure 2:
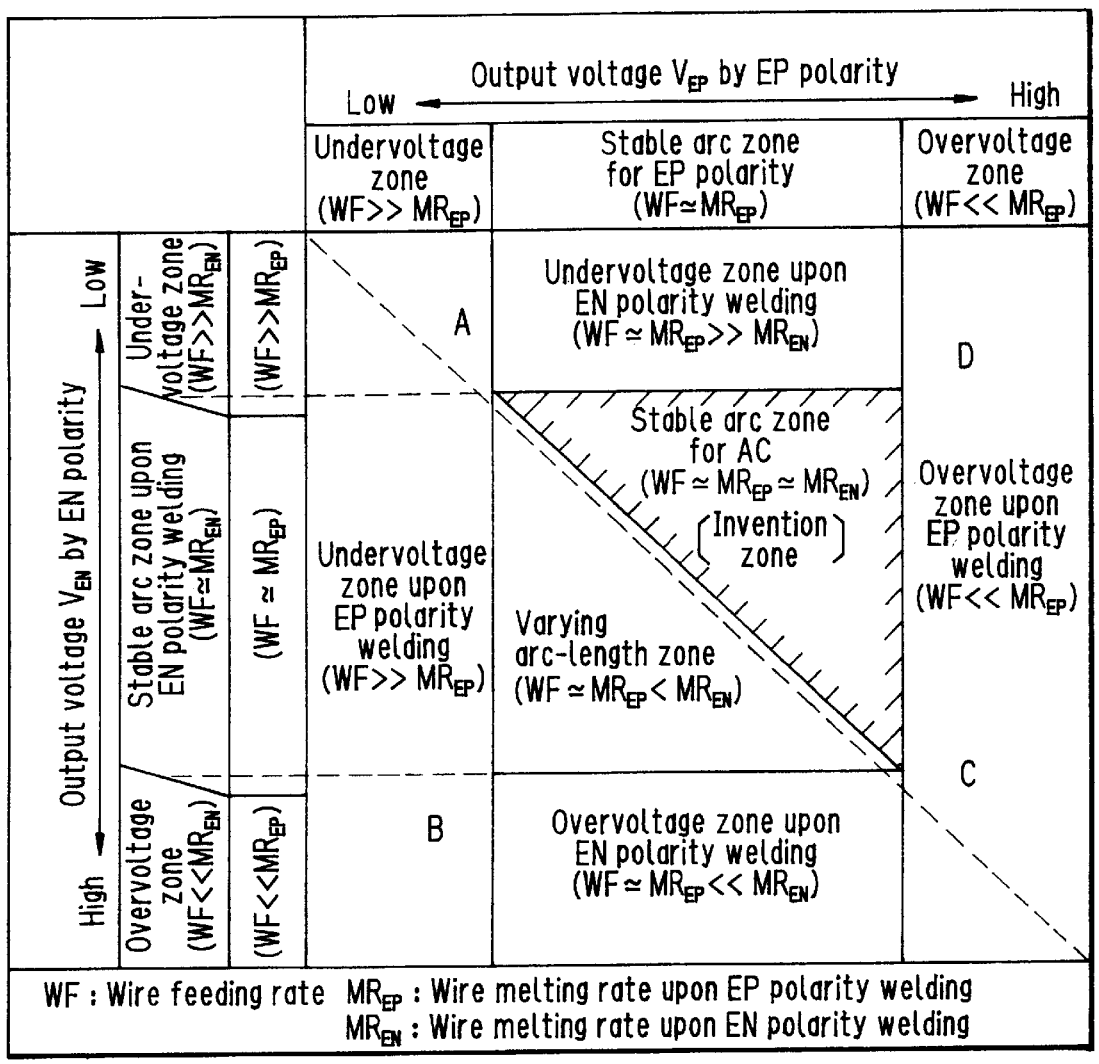
FIG. 2 is a diagram summarizing the principle of the present invention.

The principle of the present invention will next be described with reference to FIG. 2, in which characteristics of AC welding are summarized by plotting, along the abscissa, output voltages $V_{EP}$ set upon performing short-circuiting transfer welding by EP polarity alone and, along the ordinate, output voltages $V_{EN}$ set upon performing welding by EN polarity alone.

In AC arc welding where EN polarity and EP polarity are alternately repeated, it is necessary to set the voltage upon EP polarity welding at a proper level so that the wire feeding rate WF and the wire melting rate $MR_{EP}$ upon EP polarity welding can be balanced with each other. Accordingly, welding is performed by setting at a proper level the output voltage $V_{EP}$ during EP polarity welding (namely, the wire feeding rate WF≈ the wire melting rate $MR_{EP}$). If the output voltage $V_{EN}$ during EN polarity welding is too low or too high in this welding, the wire melting rate $MR_{EN}$ during EN polarity welding becomes too small or too large so that no stable AC arc is available. It is thus necessary to set the output voltage at least within an area ABCD in FIG. 2, said area being an appropriate voltage range for conducting welding by EP polarity or EN polarity alone.

When a constant AC voltage is supplied, the wire melting rate is determined by the setting level of output voltage in both EP polarity welding and EN polarity welding. Since the wire feeding rate WF≈ wire melting rate $MR_{EP}$< the wire melting rate $MR_{EN}$ as illustrated in FIG. 1, setting of the output voltage $V_{EP} \leq$ the output voltage $V_{EN}$ results in excessive melting of the wire during EN polarity welding. The arc length hence fluctuates in synchronization with the AC cycle, thereby making it impossible to perform stable AC arc welding. As a consequence, it is the triangular area indicated by slant lines in FIG. 2, namely, the range where the output voltage $V_{EP}$ is higher than the output voltage $V_{EN}$ that a stable AC arc can be maintained. In this area, the wire feeding rate WF≈ the wire melting rate $MR_{EP}$≈ the wire melting rate $MR_{EN}$. Even when the wire is fed at a constant rate, it is still possible to obtain a stable AC arc the length of which does not undergo much polarity-dependent fluctuations. Further, no limitation is imposed on the AC frequency or the percentages of a period of EN polarity and a period of EP polarity.

Machines suitable for use in the practice of the present invention will next be described based on the embodiments illustrated in FIGS. 3 and 4.

The welding machine according to the first embodiment of the present invention will first be described with reference to FIG. 3. Designated at numeral 1 is a primary rectifier, which is connected at an input side thereof to a commercial AC power source and at an output side thereof to an input side of a primary inverter 2. Numeral 3 indicates a welding transformer, which is connected at an input side thereof to an output side of the primary inverter 2 and at an output side thereof to an input side of a secondary rectifier 4. The secondary rectifier 4 is connected at an output side thereof to an input side of a secondary inverter 6 via a DC reactor 5. The secondary inverter 6 is connected at an output side thereof to a wire 7 and a base metal 8. Designated at numeral 9 is a minimum current compensator, which is a power supply of substantially constant current characteristics. The minimum current compensator 9 is connected at an terminal thereof to the input side of the secondary rectifier 4 and at an opposite terminal thereof to the output side of the secondary rectifier 4 via a reactor 10.

Numeral 11 indicates a PWM controller, which is connected at an input side thereof to an output voltage controller 12 and at an output side thereof to the primary inverter 2. Numerals 13 and 14 indicate a setting device for an output voltage $V_{EP}$ during EP polarity welding and a setting device for an output voltage $V_{EN}$ during EN polarity welding, respectively. These setting devices 13,14 are both connected to the output voltage controller 12. Designated at numeral 15 is a polarity period controller, which is connected to the secondary inverter 6 and also to the output voltage controller 12. Numerals 16,17 indicate a setting device for a period $T_{EP}$ of EP polarity and a setting device for a period $T_{EN}$ of EN polarity. These setting devices 16,17 are both connected to the polarity period controller 15. Designated at numeral 18 is a wire feed controller, which energizes an unillustrated motor to drive rollers 19.

A description will next be made of operation of the welding machine according to the first embodiment of the present invention.

Output voltages $V_{EP},V_{EN}$ are set beforehand by the setting devices 13,14, respectively. Likewise, periods $T_{EP},T_{EN}$ are set in advance by the setting devices 16,17, respectively. Further, a welding current is also set beforehand by setting a wire feeding rate. When welding is initiated, the polarity period controller 15 outputs signals to the output voltage controller 12 and the secondary inverter 6 whenever the periods set by the setting devices 16,17 are elapsed. In the period $T_{EP}$ the output voltage controller 12 selects the voltage set at the setting device 13, and in the period $T_{EN}$, the output voltage controller 12 selects the voltage set at the setting device 14. The output voltage controller 12 outputs to the PWM controller 11 a control signal which corresponds to the level of the voltage so selected. The PWM controller 11 controls the primary inverter 2 in such a way that a voltage to be applied between the wire 7 and the base material 8 will become equal to the output voltage $V_{EP}$ or the output voltage $V_{EN}$. On the other hand, the secondary inverter 6 is changed over in polarity by a signal from the output voltage controller 12. The minimum current compensator 9 serves to prevent a welding current from dropping to or beyond a predetermined level. Further, the reactor 10 generates a spike voltage at alternation, and avoids an arc interruption to assure smooth rearcing at alternation even when conditions at alternation do not become constant due to presetting of relatively low voltages and frequent irregular repetition of short circuiting and arc.

Incidentally, setting of the output voltage $V_{EN}$ by the setting device 14 at a level about 1 to 2 V lower than the output voltage $V_{EP}$ set at the setting device 13 makes it possible to reduce fluctuations in the length of an arc during welding, which fluctuations take place due to changes in polarity.

Figure 3:
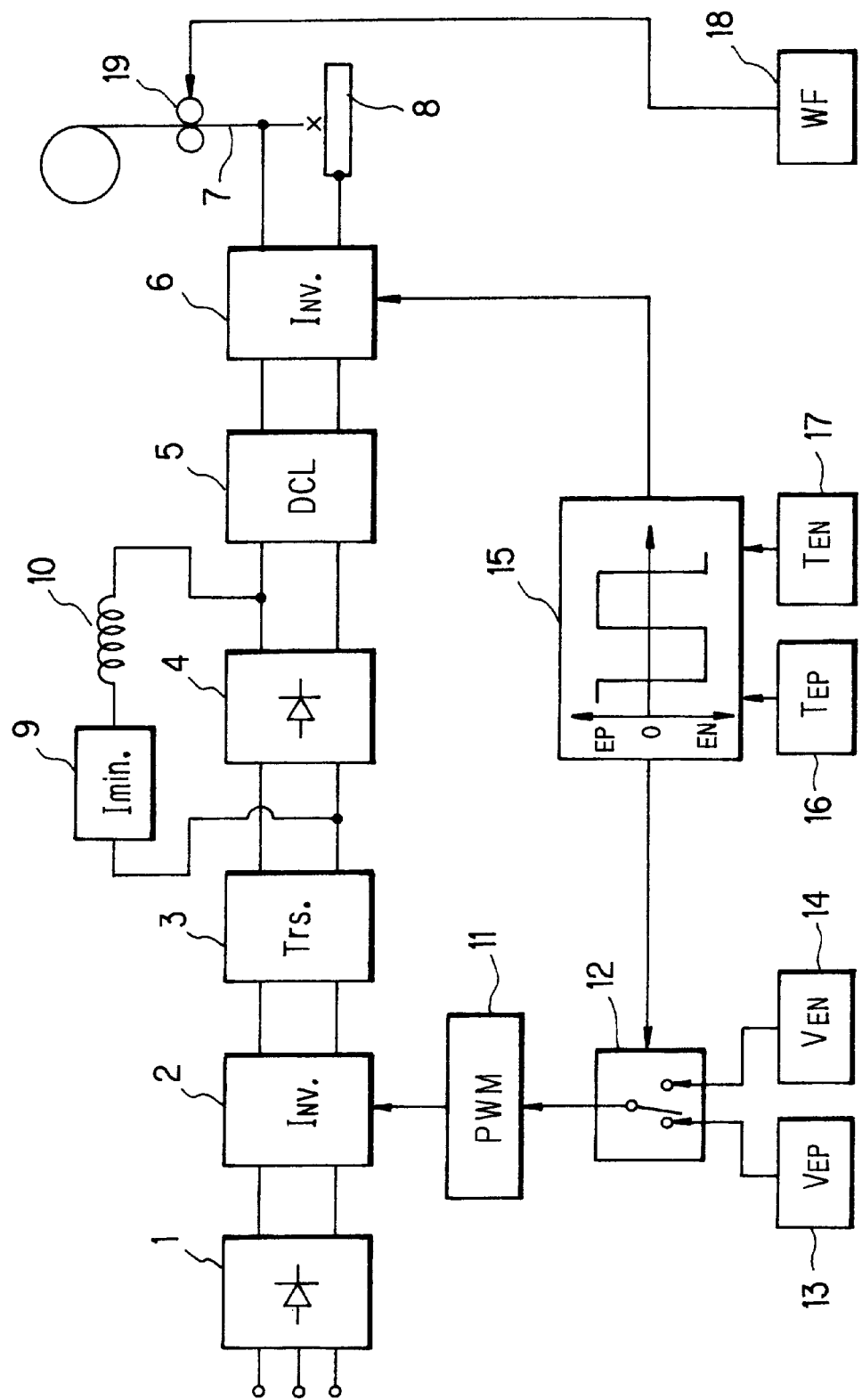
FIG. 3 is a block diagram of a welding machine according to a first embodiment of the present invention.

The welding machine according to the second embodiment of the present invention will next be described with reference to FIG. 4, in which elements of construction which are identical to the corresponding elements in FIG. 3 or have the same functions as the corresponding elements in FIG. 3 are identified by like reference numerals. A description of such elements is hence omitted herein. In FIG. 4, numeral 22 indicates a setting device for an AC frequency $f_{AC}$ (=1/($T_{EP}$+ $T_{EN}$), and the setting device 22 is connected to a computing device 16a for a period $T_{EP}$ and also to a computing device 17a for a period $T_{EN}$. Designated at numeral 23 is a setting device for an EP period time percentage $\delta$(=100$T_{EP}$/($T_{EP}$+ $T_{EN}$), and the setting device 23 is connected to the computing device 16a and also to the computing device 17a. Numeral 30 indicates a setting device for an average welding voltage $V_{av}$, which is connected to the setting device 13, a setting device 31 and the wire feeding rate controller 18. Incidentally, the setting device 31 inputs, to the setting device 14, a command value of voltage obtained by subtracting $\alpha$, which has been set by the setting device 31, from an average welding voltage $V_{av}$ set by the setting device 30.

Operation of the welding machine according to the second embodiment of the present invention will hereinafter be described. By the setting devices 22,23,30, an AC frequency $f_{AC}$, a time percentage $\delta$ and an average welding voltage $V_{av}$ are set in advance. Further, a welding current is set beforehand by setting a wire feeding rate. When welding is initiated, the polarity period controller 15 outputs signals to the output voltage controller 12 and the secondary inverter 6 whenever periods $T_{EP}$,$T_{EN}$ computed in accordance with the below-described formulas by the computing devices 16a,17a, respectively, are elapsed.

$$T_{EP} = \delta/100 \cdot f_{AC},$$

and $$T_{EN} = (100-\delta)/100 \cdot f_{AC}.$$

The output voltage controller 12 selects the average voltage $V_{av}$, which has been set by the setting device 30, as $V_{EP}$ in the period $T_{EP}$ or selects a voltage, which has been obtained by subtracting $\alpha$ set by the setting device 31 from the average welding voltage $V_{av}$ set by the setting device 30, as $V_{EN}$ in the period $T_{EN}$; and outputs to the PWM controller 11 a control signal which corresponds to the thus-selected voltage level.

Compared with the first embodiment, the second embodiment requires to set fewer parameters and hence, is easier in the setting of welding conditions. Incidentally, the setting devices 30,31 may be connected directly to the output voltage controller 12 without arrangement of the setting devices 13,14.

Figure 4:
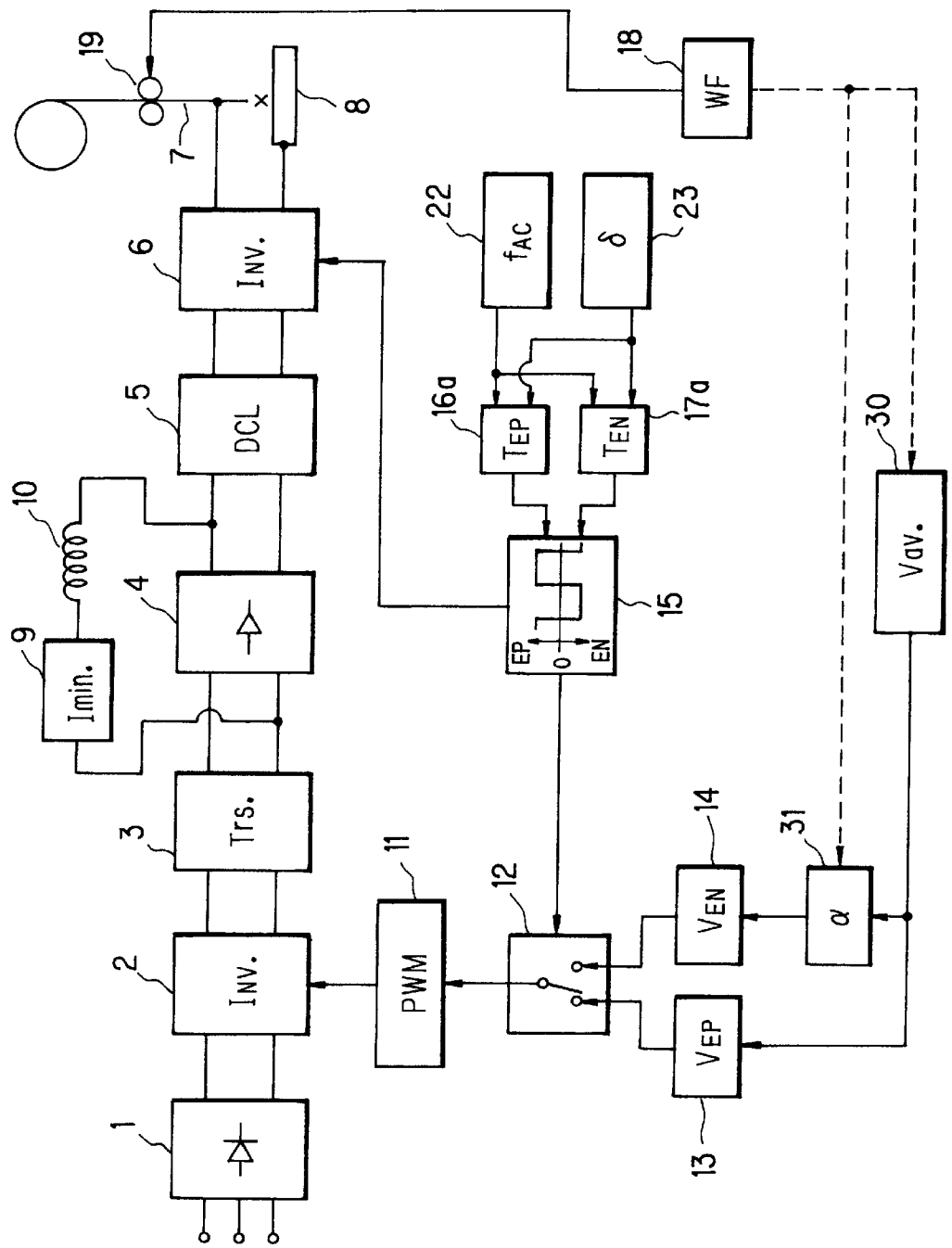
FIG. 4 is a block diagram of a welding machine according to a second embodiment of the present invention.

Further, the average welding voltage $V_{av}$ and the difference $\alpha$ may be determined as functions of the welding current or the wire feeding rate and, as shown by dashed lines in FIG. 4, may be set automatically based on a signal from the wire feeding rate controller 18.

It is to be noted that the functions, which have been described with reference to FIG. 4, are not required to be used all together but may be selectively used as needed.

Welding was performed using the present invention. Representative examples of the results of the welding are tabulated in FIG. 5. As is apparent from the table, good welding results were obtained in all the examples although the wire diameter, the composition of shielding gas, the wire feeding rate, the AC frequency $f_{AC}$ and the percentage $\delta$ of EP polarity period were varied widely.

Figure 6:
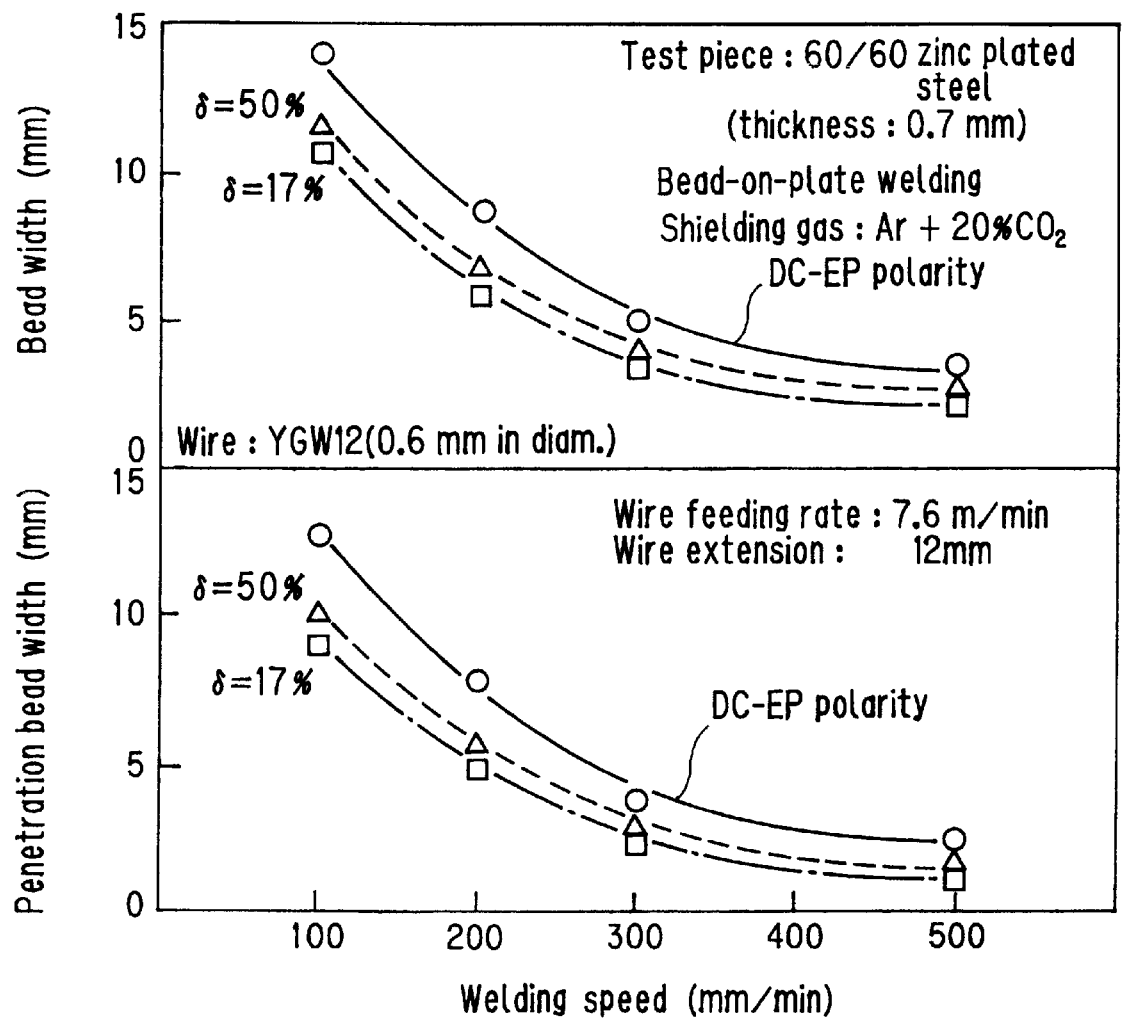
FIG. 6 is a diagram showing effects of the percentage δ of the length of a period of EP polarity.

Effects of the percentage $\delta$ of the length of a period of EP polarity will next be described with reference to FIG. 6. As an example, bead-on-plate welding was performed on a zinc-plated steel of 0.7 mm in thickness by metal active gas welding. The welding machine according to the second embodiment of the present invention was used. As a wire, a JIS YGW12 wire of 0.6 mm in diameter was used. The wire feeding rate was controlled at a constant speed of 7.6 m/min. Ar+20% $CO_2$ premixed gas was fed as shielding gas. Further, the EP voltage $V_{EP}$ was set at 17.5 V, the EN voltage $V_{EN}$ at 16.5 V, the AC frequency $f_{AC}$ at 3.3 Hz, and the percentage $\delta$ of EP polarity period at 50% or 17%. At each welding speed, the selection of the smaller $\delta$ resulted in smaller bead width and penetration bead width, and led to the formation of a convex bead of shallower penetration. Further, even in AC welding at $\delta$=50%, the above-described tendency was more marked than that in the case of conventional DC-EP polarity welding shown by solid curves in the diagram.

Figure 7:
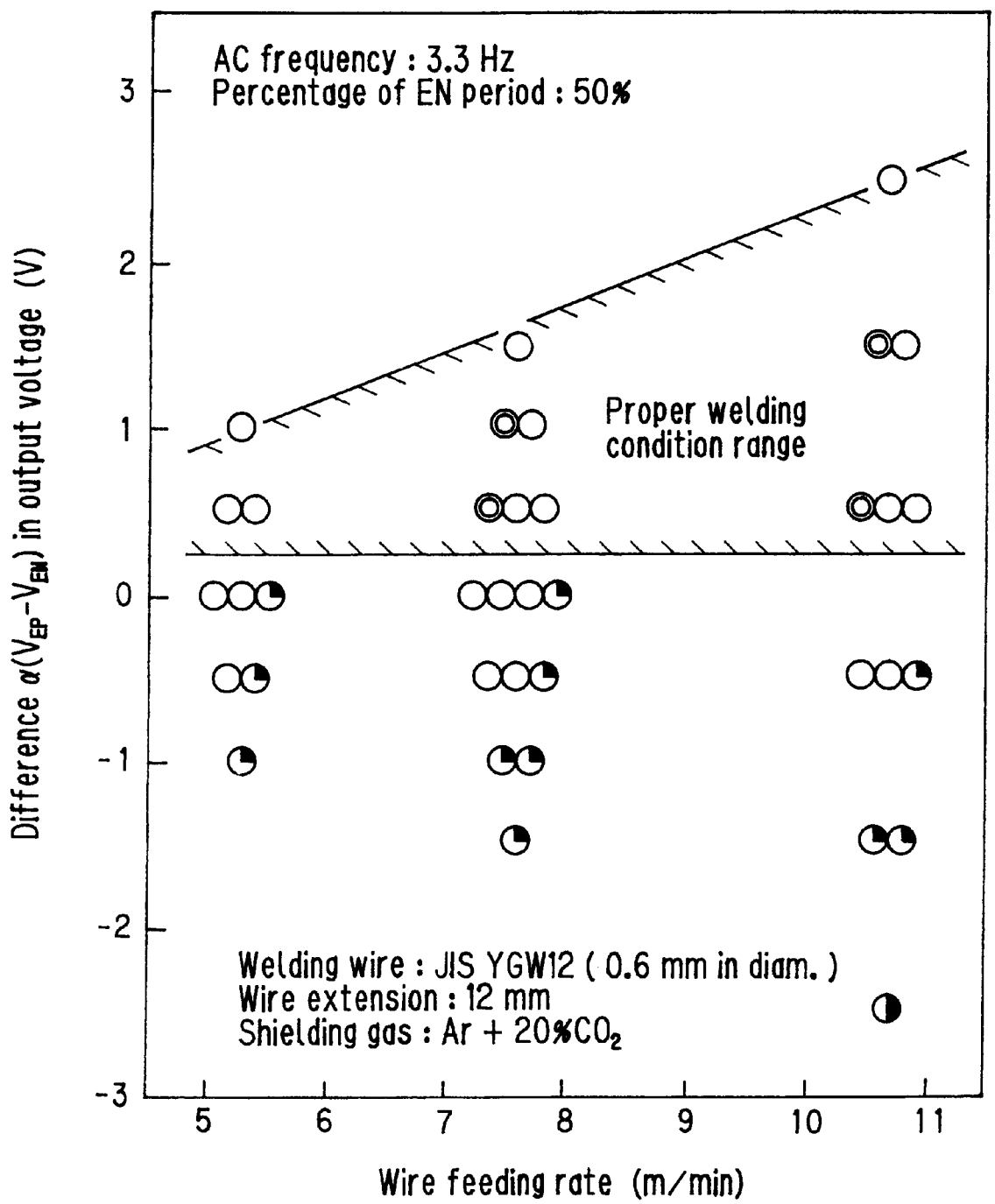
FIG. 7 is a diagram showing a relationship between wire feeding rate and a difference α in output voltage between EP polarity and EN polarity.

Further, a relationship between wire feeding rate and a difference $\alpha$ (=$V_{EP}$-$V_{EN}$) in output voltage between EP polarity and EN polarity will be described with reference to FIG. 7. As a wire, a YGW12 wire of 0.6 mm in diameter was used. Ar+20% $CO_2$ premixed gas was fed as shielding gas. Further, the AC frequency $f_{AC}$ and the percentage $\delta$ of EP polarity period were set constant at 3.3 Hz and 50%. In the diagram, circles with smaller black areas indicate better arc behavior. The values of output voltage $V_{EP}$ and $\alpha$ were varied widely. It has been found that irrespective of the output voltage $V_{EP}$, it is the range of $\alpha$>0 that provides proper welding results. It has also been found that the upper limit of $\alpha$ increases with the wire feeding rate.

Using zinc-plated steel of 0.7 mm in thickness, one side fillet welding for lap joint was performed at a root gap of 2 mm. External appearance and cros-ssection of each bead formed as a result of the welding are shown in FIG. 8. (a) indicates welding results according to the present invention, while (b) shows the results of conventional DC-EP polarity welding. As is readily understood from the figure, one side fillet welding for lap joint, which was performed using the welding machine according to the present invention (AC frequency $f_{AC}$: 3.3 Hz, percentage $\delta$ of EP polarity period: 50%), resulted in the formation of a good fillet bead without much penetration to the back side. The bead presents such configurations that absolutely no consideration appears to be needed against burn-through. On the other hand, the conventional welding failed to form any good fillet bead, because burn-through took place as the plate thickness was extremely small and the root gap was about three times as much as the plate thickness.

Described specifically, since a base metal is cold shortly after initiation of welding (at the position indicated by "a" in the figure), melt of a wire deposits on the lower plate and gradually piles up owing to surface tension. When the melt reaches an upper plate, the upper plate and the lower plate are bridged so that a good fillet bead is formed. When the temperature of the base metal rises as the welding proceeds, molten pool spreads out in a horizontal direction and lies flat. No bridge is formed between the upper plate and the lower plate (the position indicated by "b" in the figure). If the welding state at "a" continues further, an excessively large quantity of heat is absorbed in the lower plate. The lower plate is thus caused to completely fuse so that burn-through of the lower plate takes place (at the position indicated by "c" in the figure).

This application claims the priority of Japanese Patent Application No. HEI 10-030023 filed Feb. 12, 1998, which is incorporated herein by reference.

What is claimed is:

1. A gas-shielded consumable-electrode AC arc welding method making use of a consumable electrode for performing welding by supplying a substantially constant AC voltage between the consumable electrode, which is being fed at a substantially constant rate, and a workpiece, which comprises:

setting a period of EP polarity and a period of EN polarity beforehand; and setting an EN output voltage, which is to be outputted during said period of EN polarity, at a level lower by 0.1 to 2.5V than an EP output voltage to be outputted during said period of EP polarity.

2. The method according to claim 1, wherein said EP output voltage is set such that a welding current in said period of EP polarity remains not higher than a critical current level.

3. The method according to claim 1, wherein an AC frequency in said period of EP polarity and an AC frequency in said period of EN polarity are both set at a level not higher than 100 Hz.

4. The method according to claim 1, wherein an AC frequency in said period of EP polarity and an AC frequency in said period of EN polarity are both set at a level not higher than 10 Hz.

5. A gas-shielded consumable-electrode AC arc welding machine making use of a consumable electrode and adapted to supply a substantially constant alternating voltage between said consumable electrode and a workpiece via an output circuit, whereby a droplet formed at a tip of said consumable electrode is short-circuiting transferred, comprising:

a wire feed controller for feeding said consumable electrode at substantially a constant rate, a setting device for a period of EP polarity, a setting device for a period of EN polarity, a setting device for an EP output voltage to be outputted during said period of EP polarity, a setting device for an EN output voltage to be outputted during said period of EN polarity, an output voltage controller for controlling levels of said EP and EN output voltages based on signals outputted from said setting devices for said EP and EN output voltages, respectively, and a polarity period controller (15) for controlling lengths of said periods of EP and EN polarities based on signals outputted from said setting devices for said periods of EP and EN polarities, respectively, whereby a welding output is controlled; and a circuit formed of a minimum current compensator, which serves to compensate a lower limit of a welding current, and a reactor connected in series with said minimum current compensator, and connected in parallel with said output circuit.

6. The machine according to claim 5, further comprising:

an AC frequency setting device for setting an AC frequency, and a time percentage setting device for setting a time percentage of said period of EP polarity, whereby lengths of said periods of EP and EN polarities are set in accordance with the following formulas:

$$T_{EP} = \delta/100 \cdot f_{AC},$$

and $$T_{EN} = (100-\delta)/100 \cdot f_{AC}$$

where
$f_{AC}$: AC frequency,
$\delta$: time percentage of period of EP polarity,
$T_{EP}$: period of EP polarity, and
$T_{EN}$: period of EN polarity.

7. The machine according to claim 5, further comprising:

a setting device for an average welding voltage, and a setting device for a difference between said EP output voltage and said EN output voltage, whereby said levels of said output EP and EN voltages are set in accordance with the following formulas:

$$V_{EP} = V_{av},$$

and $$V_{EN} = V_{av} - \alpha$$

where
$V_{av}$: average welding voltage,
$V_{EP}$: EP output voltage,
$V_{EN}$: EN output voltage, and
$\alpha$: difference between EP output voltage ($V_{EP}$) and EN output voltage ($V_{EN}$).

8. The machine according to claim 7, further comprising:

an AC frequency setting device for setting an AC frequency, and a time percentage setting device for setting a time percentage of said period of EP polarity, whereby lengths of said periods of EP and EN polarities are set in accordance with the following formulas:

$$T_{EP} = \delta/100 \cdot f_{AC},$$

and $$T_{EN} = (100-\delta)/100 \cdot f_{AC}$$

where
$f_{AC}$: AC frequency,
$\delta$: time percentage of period of EP polarity,
$T_{EP}$: period of EP polarity, and
$T_{EN}$: period of EN polarity.

9. The machine according to claim 7, further comprising a setting device for increasing or decreasing said difference between said EP output voltage and said EN output voltage on a basis of a wire feeding rate signal outputted from said wire feed controller.

* * * * *